United States Patent
Wei et al.

(10) Patent No.: US 11,706,814 B2
(45) Date of Patent: Jul. 18, 2023

(54) COMMUNICATIONS DEVICE, INFRASTRUCTURE EQUIPMENT AND METHODS

(71) Applicants: Sony Group Corporation, Tokyo (JP); Sony Mobile Communications Inc., Tokyo (JP)

(72) Inventors: Yuxin Wei, Basingstoke (GB); Brian Alexander Martin, Basingstoke (GB); Anders Berggren, Lund (SE); Vivek Sharma, Basingstoke (GB); Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/391,070

(22) Filed: Aug. 2, 2021

(65) Prior Publication Data

US 2021/0360704 A1 Nov. 18, 2021

Related U.S. Application Data

(63) Continuation of application No. 16/475,697, filed as application No. PCT/EP2018/050096 on Jan. 3, 2018, now Pat. No. 11,102,821.

(30) Foreign Application Priority Data

Jan. 5, 2017 (EP) .................................... 17150480

(51) Int. Cl.
*H04W 74/08* (2009.01)
*H04W 76/27* (2018.01)

(52) U.S. Cl.
CPC ....... *H04W 74/0833* (2013.01); *H04W 76/27* (2018.02)

(58) Field of Classification Search
CPC ............. H04W 74/0833; H04W 76/27; H04W 72/0446; H04W 72/0453; H04W 74/006
See application file for complete search history.

(56) References Cited

U.S. PATENT DOCUMENTS

| 9,516,625 | B2 | 12/2016 | Zakrzewski |
| 10,306,681 | B2 * | 5/2019 | Yi ........................ H04J 11/0026 |
| 10,652,862 | B2 * | 5/2020 | Baghel ................. H04W 76/12 |
| 11,202,285 | B2 * | 12/2021 | Jang ..................... H04W 72/14 |

FOREIGN PATENT DOCUMENTS

CN    205723792 A    6/2016

OTHER PUBLICATIONS

International Search Report and Written Opinion dated Mar. 16, 2018 for PCT/EP2018/050096 filed on Jan. 3, 2018, 11 pages.
Nokia et al., "Data transmission in Inactive", 3GPP TSG-RAN WG2 Meeting No. 96 R2-167706, Reno, USA, Nov. 14-18, 2016, 7 pages.

(Continued)

*Primary Examiner* — Chandrahas B Patel
(74) *Attorney, Agent, or Firm* — Xsensus LLP

(57) ABSTRACT

A communications device that, when in an inactive state, transmits a first signal comprising a random access preamble and a first portion of data to infrastructure equipment, receives a random access response message from the infrastructure equipment, and transmits a second signal comprising a second portion of the data to the infrastructure equipment.

18 Claims, 6 Drawing Sheets

(56) References Cited

OTHER PUBLICATIONS

Samsung, "Overall procedure for data transfer in inactive state", 3GPP TSG-RAN WG2 Meting No. 6 R2-168051, Reno, USA, Nov. 14-18, 2016, pp. 1-6.
Holma et al., "LTE for UMTS OFDMA and SC-FDMA Based Radio Access", Wiley 2009, System Architecture Based on 3GPP SAE, 11 pages.
3GPP, "LTE; Evolved Universal Terrestrial Radio Access (E-UTRA); Multiplexing and channel coding", 3GPP TS 36.212 version 13.0.0 Release 13, ETSI TS 136 212 V13.0.0, Jan. 2016, pp. 1-122.
3GPP, "LTE; Evolved Universal Terrestrial Radio Access (E-UTRA); Physical layer procedures", 3GPP TS 36.213 version 13.0 0 Release 13, ETSI TS 136 213 V13.0.0, May 2016, pp. 1-327.
Qualcomm Incorporated, "New Work Item: NarrowBand IOT (NB-IOT)", 3GPP TSG RAN Meeting No. 69 RP-151621, Phoenix, USA, Sep. 14-16, 2015, 8 pages.
NTT DOCOMO, "New SID Proposal: Study on New Radio Access Technology", 3GPP TSG RAN Meeting No. 71 RP-160671, Goteborg, Sweden, Mar. 7-10, 2016, 8 pages.
RAN2 Chairman (Intel), "Proposed Agenda", 3GPP TSG-RAN WG2 Meeting No. 94 R2-163300, Nanjing, China, May 23-27, 2016, pp. 1-16.
RAN2 Chairman (Intel), "Proposed Agenda", 3GPP TSG-RAN WG2 Meeting No. 95 R2-164600, Goteborg, Sweden, Aug. 22-26, 2016, pp. 1-15.
RAN2 Chairman (Intel), "Proposed Agenda", 3GPP TSG-RAN WG2 Meeting No. 96 R2-167400, Reno, USA, Nov. 14-18, 2016, pp. 1-18.
Huawei et al., "UL data transmission in RRC_INACTIVE", 3GPP TSG-RAN WG2 Meeting No. 96 R2-168544, Reno, Nevada, USA, Nov. 14-18, 2016, pp. 1-8.
Ericsson, "Baseline solution for small data transmission in RRC_INACTIVE", 3GPP TSG-RAN WG2 Meeting No. 96 Tdoc R2-168713, Reno, Nevada, USA, Nov. 14-18, 2016, pp. 1-7.
Office Action dated Apr. 17, 2020 in European Patent Application No. 18 700 024.5, 9 pages.
Nokia, Alcatel-Lucent Shanghai Bell, "Random access principles for new radio," 3GPP TSG-RAN WG1 #87, R1-1612299, XP051176248, Nov. 14-18, 2016, 4 pages.
SAMSUNG: "Discussion on simplified RACH procedure", 3GPP Draft; R1-1612468, 3rd Generation Partnership Project (3GPP), vol. RAN WG1, No. Reno, Nevada, USA; Nov. 14, 2016-Nov. 18, 2016 Nov. 13, 2016 (Nov. 13, 2016), XP051176416, Retrieved from the Internet: URL: http://www.3gpp.org/ftp/Meetings_3GPP_SYNC/RAN 1 /Docs/ [retrieved on Nov. 13, 2016].
European Communication Pursuant to Article 94(3) dated Aug. 12, 2020 in European Application No. 18 700 024.5.

\* cited by examiner

COMMUNICATIONS DEVICE, INFRASTRUCTURE EQUIPMENT AND METHODS

CROSS-REFERENCE TO RELATED APPLICATIONS

The present application is a continuation of U.S. application Ser. No. 16/475,697, filed Jul. 3, 2019, which is based on PCT filing PCT/EP2018/050096, filed Jan. 3, 2018, which claims priority to EP 17150480.6, filed Jan. 5, 2017, the entire contents of each are incorporated herein by reference.

BACKGROUND

Field of Disclosure

The present disclosure relates to communications devices which are configured to transmit data to and receive data from infrastructure equipment of a wireless communications network, in accordance with an enhanced random access (RACH) procedure.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the Third Generation Project Partnership (3GPP) defined Universal Mobile Telecommunications Standard (UMTS) and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio access technology (which may be denoted new RAT or, simply, NR) networks, to support efficiently connectivity for a wide range of devices associated with different applications with different characteristic data traffic profiles, resulting in different devices having different operating characteristics and/or requirements.

The introduction of new radio access technology (RAT) systems/networks therefore gives rise to new opportunities as well as challenges. One such challenge is how to employ random access (RACH) procedures (which may be used for initial access from an idle mode, handover, RRC connection re-establishment, etc.) in NR systems more efficiently. In particular, there are no sufficient solutions or schemes at present for NR communications devices which can accommodate large data transmissions using RACH without those communications devices transition to a connected state.

SUMMARY OF THE DISCLOSURE

The present disclosure can help address or mitigate at least some of the issues discussed above, and provide solutions for communications devices to transmit large amounts of data using RACH without having to transition to a connected mode. As such, embodiments of the present technique can provide A communications device for transmitting data to or receiving data from a wireless communications network comprises transmitter circuitry configured to transmit signals to one or more infrastructure equipment of the wireless communications network via a wireless access interface provided by the one or more infrastructure equipment, receiver circuitry configured to receive signals from one or more of the infrastructure equipment via the wireless access interface, and controller circuitry configured to control the transmitter circuitry and the receiver circuitry to transmit or to receive the signals representing data. When the communications device is in an inactive state, the controller circuitry is configured in combination with the receiver circuitry and the transmitter circuitry to transmit a first signal comprising a random access preamble and a first portion of data to one of the infrastructure equipment, to receive a random access response message from the infrastructure equipment, and to transmit a second signal comprising a second portion of the data to the infrastructure equipment.

Embodiments of the present technique, which further relate to an infrastructure equipment, methods of operating a communications device and infrastructure equipment, as well as circuitry for the same, can provide a hybrid, enhanced RACH procedure which can be used in NR wireless communications system which has both the advantage of the reduced delay performance of the presently known two-step RACH procedure, whilst large amounts of data can be accommodated with the data transmission with the RACH.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

New Radio Access Technology (5G)

As mentioned above, the embodiments of the present invention can find application with advanced wireless communications systems such as those referred to as 5G or New Radio (NR) Access Technology. New Radio Access Technology (RAT) has been proposed in [1] to develop a new RAT for the next generation wireless communication system, i.e. 5G, and in 3GPP a Study Item (SI) on NR has been agreed [2] in order to study and develop the new RAT. The new RAT is expected to operate in a large range of frequencies, from hundreds of MHz to 100 GHz and it is expected to cover a broad range of use cases. The use cases that are considered under this SI include:

Enhanced Mobile Broadband (eMBB)
Massive Machine Type Communications (mMTC)
Ultra Reliable & Low Latency Communications (URLLC)

Figure 1:
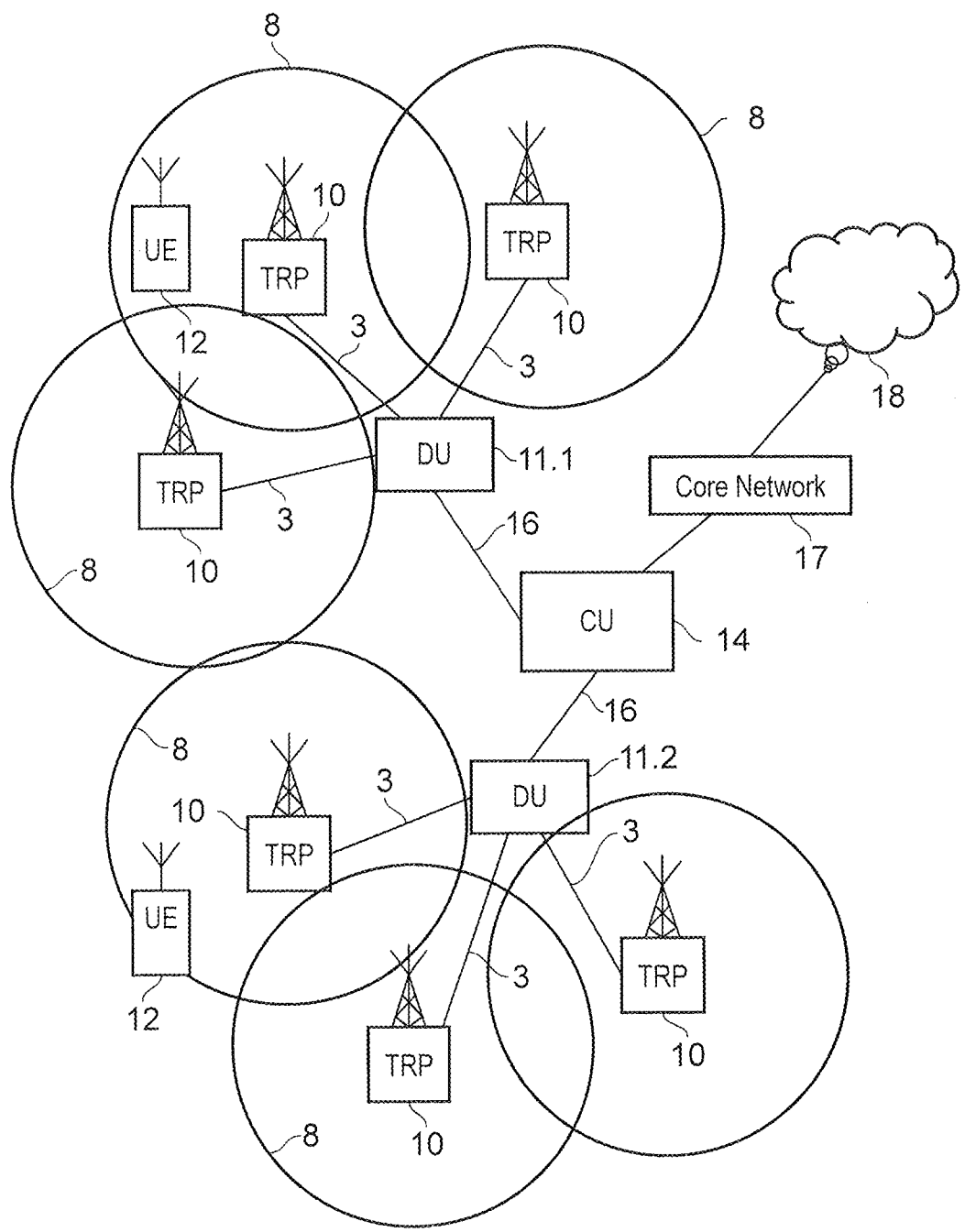
FIG. 1 is a schematic block diagram of a wireless communications system with architectural components corresponding to that of an example enhanced new radio or 5G network.

The aim of 5G is not only mobile connectivity for people, but to provide ubiquitous connectivity for any type of device and any type of application that would benefit from being connected. Many requirements and use-cases are still being discussed, but amongst those are:

Low latency
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars)
Low device cost and energy consumption
Flexible spectrum usage
Flexible mobility An example configuration of a wireless communications network which uses some of the terminology proposed for NR and 5G is shown in FIG. 1. In FIG. 1 a plurality of transmission and reception points (TRP) 10 are connected to distributed control units (DU) 11.1, 11.2 by a connection interface represented as a line 3. Each of the transmitter receiver points (TRP) 10 is arranged to transmit and receive signals via a wireless access interface within a radio frequency bandwidth available to the wireless communications network. Thus within a range for performing radio communications via the wireless access interface, each of the TRP 10, forms a cell of the wireless communications network as represented by a dashed line 8. As such wireless communications devices 12 which are within a radio communications range provided by the cells 10 can transmit and receive signals to and from the TRP 10 via the wireless access interface. Each of the distributed control units 11.1, 11.2 are connected to a co-ordinating unit (CU) 14 via an interface 16. The CU 14 is then connected to the a core network 17 which may contain all other functions required for communicating data to and from the wireless communications devices and the core network 17 may be connected to other networks 18.

The elements of the wireless access network shown in FIG. 1 may operate in a similar way to corresponding elements of an LTE network well-known and defined in the relevant standards administered by the 3GPP® body, and also described in many books on the subject, for example, Holma H. and Toskala A [3]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The transceiver processors TRP 10 of FIG. 1 may in part have a corresponding functionality to a base station or eNodeB of an LTE network, and so the terms TRP and eNodeB in the following description are interchangeable. Base stations, which are an example of radio network infrastructure equipment, may also be referred to as transceiver stations/NodeBs/eNodeBs (eNBs)/gNodeBs (gNBs), and so forth. Similarly the communications devices 12 may have a functionality corresponding to devices know for operation with an LTE network and may also be referred to as mobile stations, user equipment (UE), user terminal, terminal device, mobile radio, communications device, and so forth. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

Current RACH Procedures in LTE

In wireless telecommunications networks, such as LTE type networks, there are different Radio Resource Control (RRC) modes for terminal devices. For example, it is common to support an RRC idle mode (RRC_IDLE) and an RRC connected mode (RRC_CONNECTED). A terminal device in the idle mode may transition to connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

In addition to a terminal device deciding itself to initiate a random access procedure to connect to the network, it is also possible for the network, e.g. a base station, to instruct a terminal device in connected mode to initiate a random access procedure by transmitting to the terminal device an instruction to do so. Such an instruction is sometimes referred to as a PDCCH order (Physical Downlink Control Channel order), see, for example, Section 5.3.3.1.3 in ETSI TS 136 213 V13.0.0 (2016-01)/3GPP TS 36.212 version 13.0.0 Release 13 [4].

There are various scenarios in which a network triggered RACH procedure (PDCCH order) may arise. For example:
 a terminal device may receive a PDCCH order to transmit on PRACH as part of a handover procedure
 a terminal device that is RRC connected to a base station but has not exchanged data with the base station for a relatively long time may receive a PDCCH order to cause the terminal device to transmit a PRACH preamble so that it can be re-synchronised to the network and allow the base station to correct timings for the terminal device
 a terminal device may receive a PDCCH order so that it can establish a different RRC configuration in the subsequent RACH procedure, this may apply, for example, for a narrowband IoT terminal device which is prevented from RRC reconfiguration in connected mode whereby sending the terminal device to idle mode through a PDCCH order allows the terminal device to be configured in the subsequent PRACH procedure, for example to configure the terminal device for a different coverage enhancement level (e.g. more or fewer repetitions)

For convenience, the term PDCCH order is used herein to refer to signalling transmitted by a base station to instruct a terminal device to initiate a PRACH procedure regardless of the cause. However, it will be appreciated such an instruction may in some cases be transmitted on other channels/in higher layers. For example, in respect of an intra-system handover procedure, what is referred to here as a PDCCH order may be an RRC Connection Reconfiguration instruction transmitted on a downlink shared channel/PDSCH.

When a PDCCH order is transmitted to a terminal device, the terminal device is assigned a PRACH preamble signature sequence to use for the subsequent PRACH procedure. This is different from a terminal device triggered PRACH procedure in which the terminal device selects a preamble from a predefined set and so could by coincidence select the same preamble as another terminal device performing a PRACH procedure at the same time, giving rise to potential contention. Consequently, for PRACH procedures initiated by a PDCCH order there is no contention with other terminal devices undertaking PRACH procedures at the same time because the PRACH preamble for the PDCCH ordered terminal device is scheduled by the network/base station.

Figure 2:
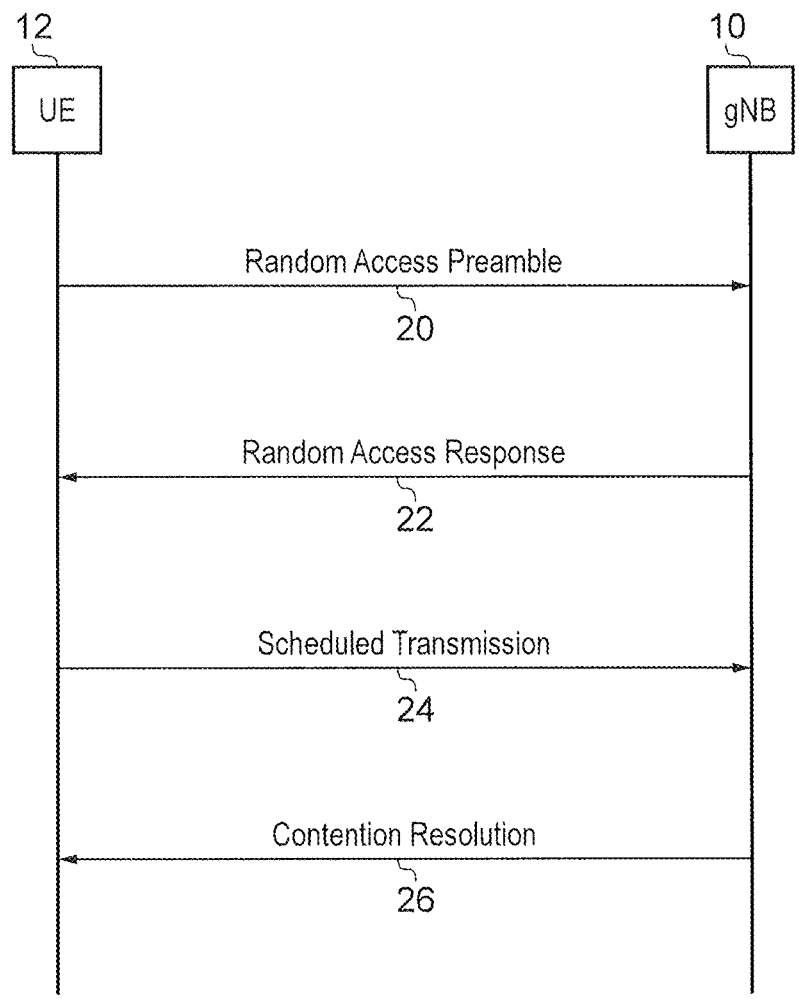
FIG. 2 is a schematic representation illustrating steps in a four-step random access procedure in a wireless telecommunications network.

FIG. 2 shows a typical RACH procedure used in LTE systems which could be applied to an NR wireless communications system such as that described by FIG. 1. A UE 12, which could be in an inactive or idle mode, may have some data which it needs to send to the network. To do so, it sends a random access preamble 20 to a gNB 10. This random access preamble 20 indicates the identity of the UE 12 to the gNB 10, such that the gNB 10 can address the UE 10 during later stages of the RACH procedure. Assuming the random access preamble 20 is successfully received by the gNB 10 (and if not, the UE 12 will simply re-transmit it with a higher power), the gNB will transmit a random access response 22 message to the UE 12 based on the identity indicated in the received random access preamble 20. The random access response 22 message carries a further identity which is assigned by the gNB 10 to identify the UE 12, as well as a timing advance value (such that the UE 12 can change its timing to compensate for the round trip delay caused by its distance from the gNB 10) and grant uplink resources for the UE 12 to transmit the data in. Following the reception of the random access response message 22, the UE 12 transmits the scheduled transmission of data 24 to the gNB 10, using the identity assigned to it in the random access response message 22. Assuming there are no collisions with other UEs, which may occur if another UE and the UE 12 send the same random access preamble 20 to the gNB 10 at the same time and using the same frequency resources, the scheduled transmission of data 24 is successfully received by the gNB 10. The gNB 10 will respond to the scheduled transmission 24 with a contention resolution message 26.

In various 3GPP RAN2 meetings, some agreements have been achieved on assumptions for how UE states (e.g. RRC_IDLE, RRC_CONNECTED etc.) may translate to NR systems. In RAN2 #94, it was agreed that a new "inactive" state should be introduced, where the UE should be able to start data transfer with a low delay (as required by RAN requirements). At the time of RAN2 #94, an issue concerning how data transmissions would work when UEs are in the inactive state were unresolved; it was agreed that it was for further study whether data transfer should achieved by leaving the inactive state or whether data transfer should occur from within the inactive state.

In RAN2 #95, it was agreed that the possibility of the UE being able to transmit data in the inactive state without transition to connected state will be studied.

In RAN2 #95bis, two approaches were identified as follows, in addition to a baseline move to the connected state before the transmission of data:
 Data could be transmitted together with an initial RRC message requesting a transition to the connected state, or
 Data could be transmitted in a new state.

In RAN2 #96, two email discussions are to be initiated, to discuss uplink data transmission in the inactive state. The intention of these discussions is to capture detail of the solution for sending uplink data without RRC signalling in the inactive state and without the UE initiating a transition to the connected state. Focus should be on the RAN2 aspects and to be as independent as possible of the physical layer mechanism that is used.

Figure 3:
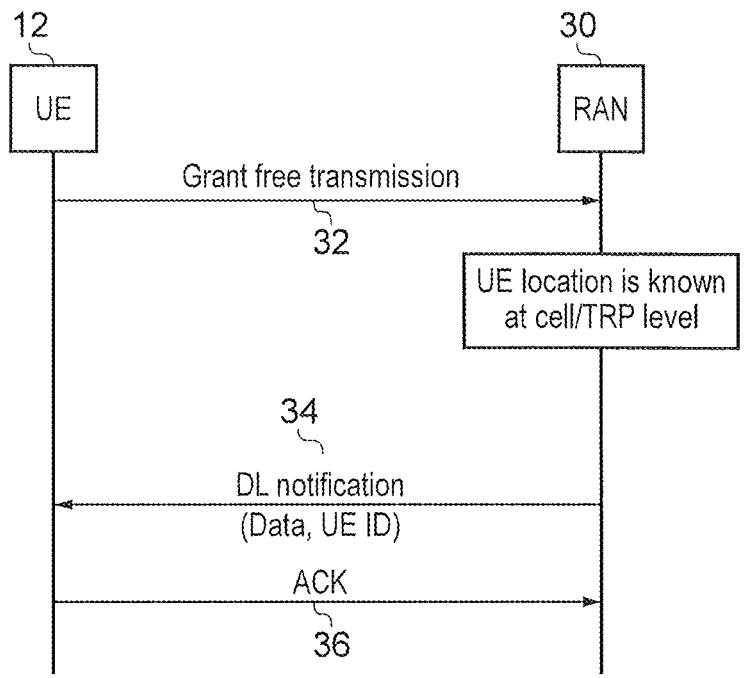
FIG. 3 is a schematic representation illustrating an example of uplink data transmission of a communications device in RRC_INACTIVE mode with a downlink response from the network.

A first potential solution is discussed in 3GPP document R2-168544 titled "UL data transmission in RRC_INACTIVE" (Huawei) [5]. This solution is shown in FIG. 3, which is reproduced along with the accompanying text from [5]. As shown in FIG. 3, an uplink data transmission 32 can be made by a network 30 in the RRC_INACTIVE state to an eNB 10. The network 30 here at least knows in which cell the transmission 32 was received, and potentially may even know via which TRP. For a certain amount of time after receiving an uplink data packet, the network 30 could assume that the UE 12 is still in the same location, so that any RLC acknowledgement or application response could be scheduled for transmission to the UE 12 in the same area where the UE 12 is, for example in the next paging response 34. Alternatively, the UE 12 may be paged in a wider area. Following reception of this downlink response 34 the UE 12 may transmit an acknowledgement 36 to the network 30 to indicate that it was successfully received.

Figure 4:
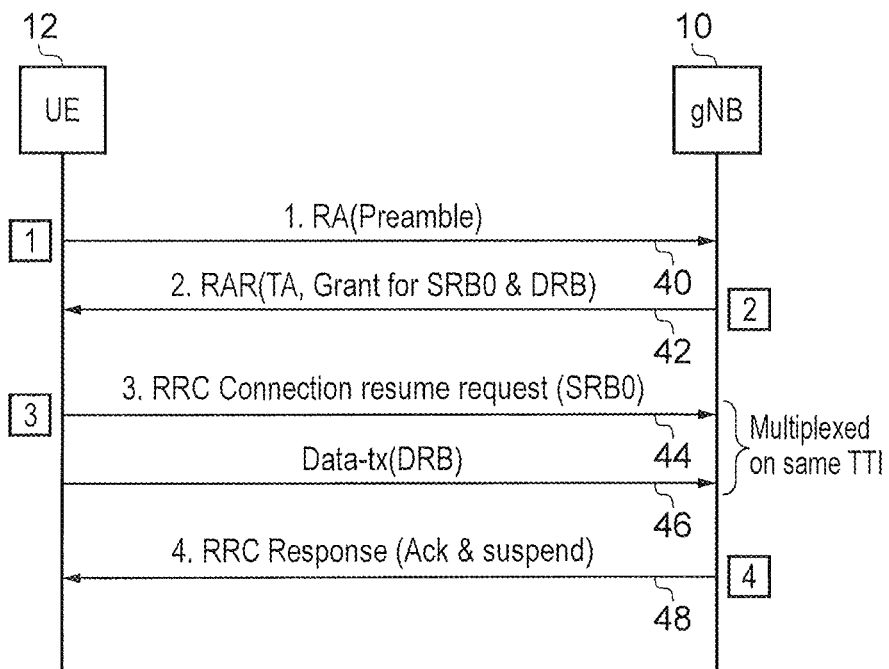
FIG. 4 is a schematic representation illustrating an example RACH procedure which could be applied for transmissions of small amounts of data.

A second potential solution is discussed in 3GPP document R2-168713 titled "Baseline solution for small data transmission in RRC_INACTIVE" (Ericsson) [6]. This solution is shown in FIG. 4, which is reproduced along with the accompanying text from [6]. The mechanism described in FIG. 4 is for small data transmissions and is based on the Suspend-Resume mechanism for LTE. The main difference is that User Plane data is transmitted simultaneously with message 3 (the RRC Connection resume request 44 in FIG. 4) and an optional RRC suspend signalled in message 4. As shown in FIG. 4, initially under the assumption of a random access scheme as in LTE, when a UE 12 receives uplink data to transmit to a gNB 10 of a mobile communications network, the UE 12 first transmits a random access (RA) preamble 40. Here a special set of preambles (a preamble partition) can be used as in LTE to indicate a small data transmission (meaning that the UE 12 wants a larger grant and possibly that the UE 12 wishes to remain in the inactive state).

The network responds with a random access response (RAR) message 42 containing timing advance and a grant. The grant for message 3 should be large enough to fit both the RRC request and a small amount of data. The allowable size of the data could be specified and linked to the preambles, e.g. preamble X asks for a grant to allow Y bytes of data. Depending on available resources, the gNB 10 may supply a grant for message 3 accommodating only the resume request, in which case an additional grant could be supplied after reception of message 3.

At this point the UE 12 will prepare the RRC Connection Resume Request 44 and perform the following actions:
Re-establish Packet Data Convergence Protocol (PDCP) for SRBs and all DRBs that are established;
Re-establish RLC for signalling radio bearers (SRBs) and all data radio bearers (DRBs) that are established. The PDCP should reset sequence numbers (SN) and hyper frame numbers (HFN) during this step;
Resume SRBs and all DRBs that are suspended;
Derive a new security key (e.g. eNB key, or KeNB) possible based on next-hop chaining counters (NCC) provided before the UE 12 was sent to the "inactive" state;
Generate encryption and integrity protection keys and configure PDCP layers with previously configured security algorithm;
Generate RRC Connection Resume Request message 44;
An indication, e.g. a buffer status report (BSR), of potentially remaining data is added;
An indication that the UE 12 wishes to remain in the inactive state (if this is not indicated by the preamble) is added;
Apply the default physical channel and media access control (MAC) configuration; and
Submit RRC Connection Resume Request 44 and data 46 to lower layers for transmission.

After these steps, the lower layers transmit Message 3. This can also contain User Plane data 46 multiplexed by MAC, like existing LTE specifications as security context is already activated to encrypt the User Plane. The signalling (using SRB) and data (using DRB will be multiplexed by MAC layer (meaning the data is not sent on the SRB).

The network 10 receives Message 3 and uses the context identifier to retrieve the UE's 12 RRC context and re-establish the PDCP and RLC for the SRBs and DRBs. The RRC context contains the encryption key and the User Plane data is decrypted (will be mapped to the DRB that is re-established or to an always available contention based channel).

Upon successful reception of Message 3 and User Plane data, the network 10 responds with a new RRC response message 48 which could either be an "RRC suspend" or an "RRC resume" or an "RRC reject". This transmission resolves contention and acts as an acknowledgement of Message 3. In addition to RRC signalling the network 10 can in the same transmission acknowledge any user data (RLC acknowledgements). Multiplexing of RRC signalling and User Plane acknowledgements will be handled by the MAC layer. If the UE 12 loses the contention then a new attempt is needed.

In case the network 10 decides to resume the UE 12, the message will be similar to a RRC resume and may include additional RRC parameters.
In case the network 10 decides to immediately suspend the UE 12, the message will be similar to a RRC suspend. This message can possibly be delayed to allow downlink acknowledgements to be transmitted.
In case the network 10 sends a resume reject the UE 12 will initiate a new scheduling request (SR) as in LTE, after some potential backoff time.

This procedure will, strictly speaking, transmit the User Plane data without the UE 12 fully entering RRC_CONNECTED, which formerly would happen when the UE 12 receives the RRC Response (Message 4) indicating resume. On the other hand, it uses the RRC context to enable encryption etc. even if the network's decision is to make the UE 12 remain in RRC_INACTIVE by immediately suspending the UE 12 again.

Figure 5:
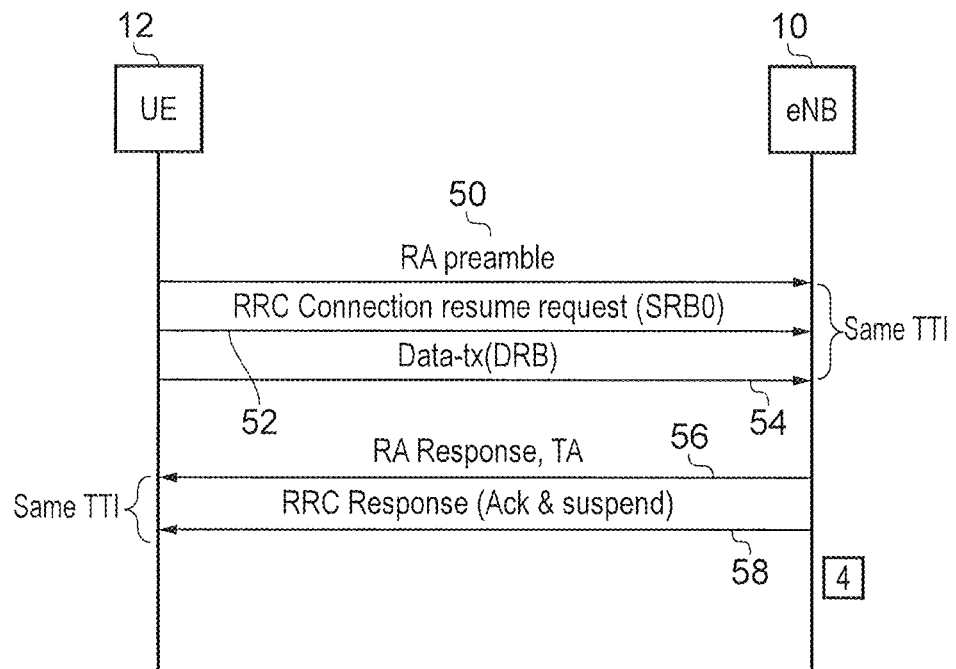
FIG. 5 is a schematic representation illustrating an example two-step RACH procedure which could be applied for transmissions of small amounts of data.
Figure 6:
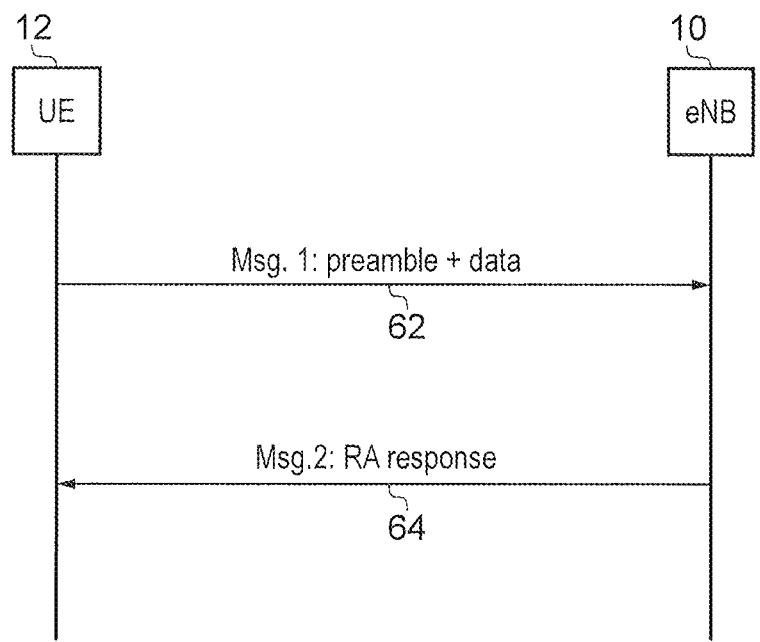
FIG. 6 is a schematic representation illustrating steps in a two-step random access procedure in a wireless telecommunications network.

FIGS. 5 and 6 each show examples of a simplified two-step RACH procedure, in which small amounts of data can be transmitted by a UE 12 to an gNB or eNB 12. In the two-step RACH procedure, the data is transmitted at the same time as the RACH preamble (message 62 in FIG. 6, and so there is no need for the UE 12 to wait for a response from the network providing it with an uplink grant to transmit its data. However, the downside is that a limited amount of data can be transmitted in message 1. Following the reception of message 1 at the eNB 10, the eNB 10 transmits a random access response (message 62 in FIG. 6) to the UE 12, which comprises an acknowledgement of the received data in message 1. FIG. 5 shows the messages in a little more detail, where in message 1, the random access preamble 50, RRC connection resume request 52 and the small amount of data 54 are transmitted during the same transmission time interval (TTI). Likewise, for message 2, the random access response with timing advance 56 and the RRC response 58 (comprising an acknowledgement and RRC suspend command) are transmitted by the eNB 10 to the UE 12 during the same TTI.

Embodiments of the present technique aim to provide a solution to optimise the four step RACH, for example the LTE RACH procedure shown in FIG. 2, and the two step RACH, such as that shown in FIGS. 5 and 6, in order to address medium to large data transmissions, where there is less delay and no requirement for communications devices to leave the inactive state.

Two-step RACH is expected to have advantages in reducing the data transmission delay and signaling overhead. However, it is only designed for small data transmissions. The reserved contention based resources for carrying the data in RACH will not be very large. Then, using the two-step RACH solution, UEs which have large amounts of data to transmit must adopt the conventional four-step LTE RACH procedure. Embodiments of the present technique provide solutions to accommodate large data transmissions, while exploiting the advantages provided by the employment of the two-step RACH design principle.

NR RACH Enhancement

Embodiments of the present technique provide systems and methods which employ a combined two-step and four-step RACH procedure to transmit data from a communications device, or UE, in an inactive state without necessitating a transition to a connected state. Such systems and methods comprise the containing of data in both message 1 and message 3, where message 1 comprises as much data as can be accommodated in the reserved contention based resources, as well as comprising an indication to ask for an additional uplink grant. Message 3 comprises the remainder of the data to transmit, which will be done so using the additional uplink grant requested in message 1. Message 2, which is the random access response from the network, comprises the additional uplink grant as well as a unique identifier, such as a Cell Radio Network Temporary Identifier (C-RNTI) for the UE.

Figure 7:
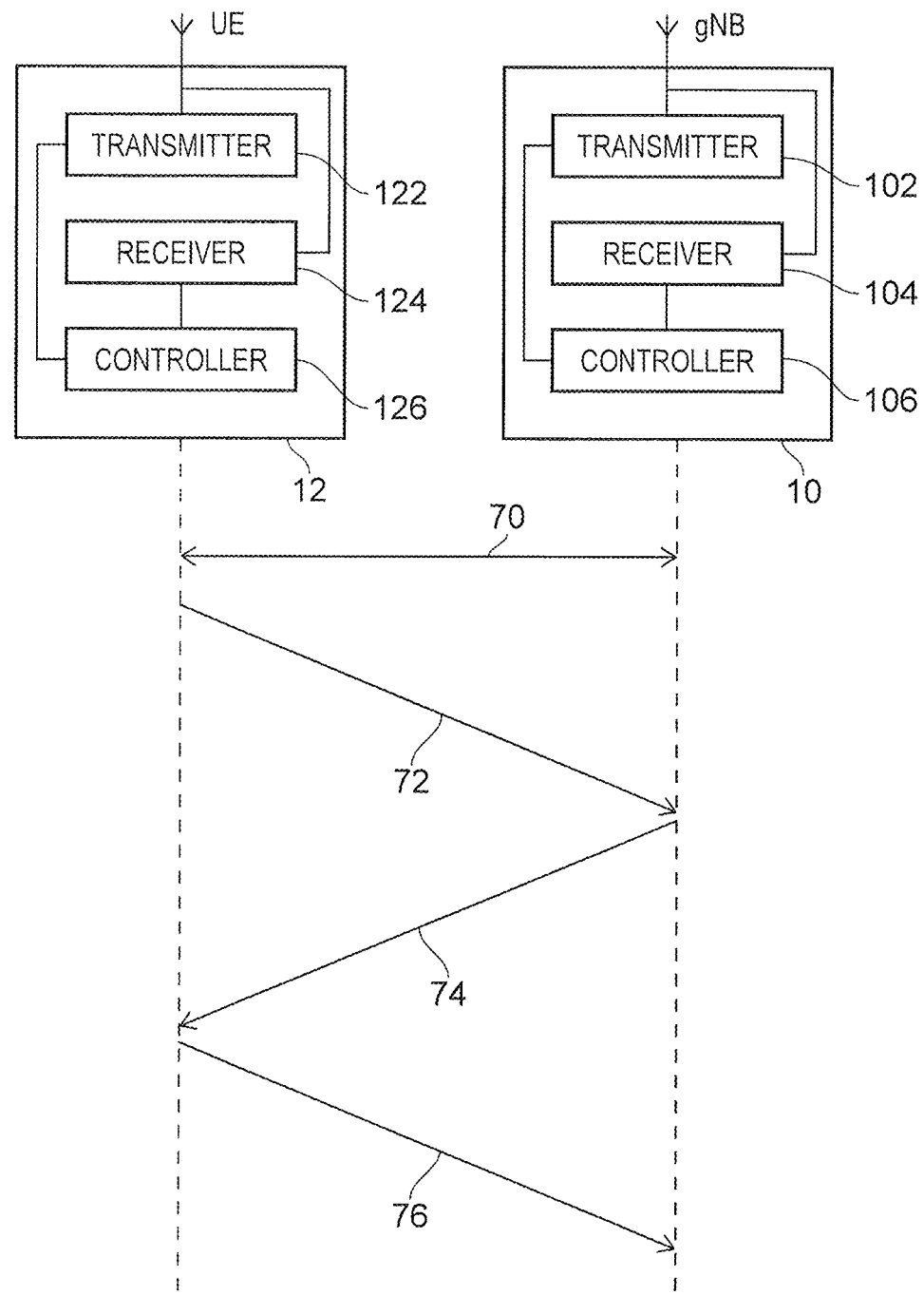
FIG. 7 is a part schematic representation, part message flow diagram of communications between a communications device and an infrastructure equipment of a wireless communications network in accordance with embodiments of the present technique.

FIG. 7 provides a part schematic representation, part message flow diagram of communications between a communications device or UE 12 and a wireless communications network in accordance with embodiments of the present technique. The communications device 12 comprises a transmitter (or transmitter circuitry) 122 configured to transmit signals to one or more infrastructure equipment or gNBs 10 of the wireless communications network via a wireless access interface 70 provided by the one or more infrastructure equipment 10, a receiver (or receiver circuitry) 124 configured to receive signals from the one or more infrastructure equipment 10 via the wireless access interface 70, and a controller (or controller circuitry) 126 configured to control the transmitter circuitry 122 and the receiver circuitry 124 to transmit or to receive the signals representing data. As can be seen in FIG. 7, the infrastructure equipment 10 also comprises a transmitter (or transmitter circuitry) 102 configured to transmit signals to the communications device 12 via the wireless access interface 70, a receiver (or receiver circuitry) 104 configured to receive signals from the communications device 12 via the wireless access interface 70, and a controller (or controller circuitry) 106 configured to control the transmitter circuitry 102 and the receiver circuitry 104 to transmit or to receive the signals representing data. Each of the controllers 126, 106 may be, for example, a microprocessor, a CPU, or a dedicated chipset, etc.

When the communications device 12 is in an inactive state (which could for example correspond to the an idle state, such as the RRC_IDLE state), the controller circuitry 126 of the communications device 12 is configured in combination with the receiver circuitry 124 and the transmitter circuitry 122 of the communications device 12 to transmit a first signal 72 comprising a random access preamble and a first portion of data to one of the infrastructure equipment 10, to receive a random access response message 74 from the infrastructure equipment 10, and to transmit a second signal 76 comprising a second portion of the data to the infrastructure equipment 10.

The preambles for the random access from the UE to gNB could be reserved in advance, e.g. in the system information of gNB. In such an instance, the gNB will broadcast the reserved preamble set for the random access, where this set differs from those used for the four-step RACH and two-step RACH procedures. In other words, this set of random access preambles are specifically used to indicate that a signal corresponding to the first signal is being transmitted—these preambles indicate that the new RACH procedure as defined by embodiments of the present technique and is shown in FIG. 7 is occurring. As an alternative to the reserved preamble set being broadcast by the gNB, it will send dedicated signalling to UEs of the allocated preambles. As another alternative, the set of random access preambles may be set in the specifications, and known to the UEs in advance.

The radio resources reserved for the transmission of data with the preamble will be notified to UE via broadcast or dedicated signalling. In other words, the controller circuitry is configured in combination with the transmitter circuitry to transmit the first signal using first radio resources indicated by the infrastructure equipment. As with the set of preambles, these could again be broadcast by the network, provided to the UE via dedicated signalling, or predefined in the specifications and hence known to the UE in advance. These resources may be different to those used for the transmission of preambles in the four-step RACH procedure, and to those used for the transmissions of preambles and the small amount of data in the two-step RACH procedure. In addition to the radio resources reserved for the transmission of data, an allowed data size will also be notified to UE via broadcast or dedicated signalling.

In some embodiments of the present technique, there may be a linkage between preamble and resource e.g. with the preamble, the location of the resource blocks could be calculated. In that case, it isn't necessary to notify the UE of the reserved radio resources explicitly. In other words, the controller circuitry is configured in combination with the transmitter circuitry to determine first radio resources which should be used to transmit the first signal on the basis of the random access preamble selected from the set of random access preambles, and to transmit the first signal using the determined radio resources. In terms of calculated resource blocks, the reserved resource blocks for the data part of the transmitted first signal should have a longer guard period, because the UE has not received a timing advance (TA) command yet at the time of the first transmission. In general, the preamble part is not required to frame timing alignment, but the data part in OFDM should follow the TA command to avoid the conflict of receiving timing at the gNB from multiple users. In the embodiments described above, reserved resource blocks for the first transmission of the data part should have enough guard periods to absorb propagation delay between the UE and the gNB without a TA command. Preferably, a common predetermined guard period and a predetermined transmission time unit (in other words, transmission time interval (TTI) for the data part of the first transmission) should be used. This does not prevent there being multiple data sizes and TTI lengths, but a guard period should be inserted at suitable position and have a suitable length. In order to calculate the location of the resource blocks, the assistance information may be sent with system information, or may be defined within the 3GPP specifications (e.g. variables for calculation formula such as the required guard period, an allowable TTI length, frequency region and so on).

As the reserved radio resources for data transmission in RACH will not be large, the data carried in message 1 would be only part of the overall data that UE want to transmit, it may include, for example:

UE ID for contention resolution;
An indication to show there will be more data to transmit;
The data size to be transmitted;
RRC message, e.g. RRC connection resume request, RRC connection setup request etc. in order to address large/continuous data transmission; and
Part of user data which can be accommodated with reserved radio resources.

In other words, the first signal further comprises one or more of a first portion of user data, an identifier of the communications device, an indication that the second portion of data is available to be transmitted, an indication of the size of the second portion of data, and a Radio Resource Control, RRC, message comprising a request to resume an RRC connection or a request to set up a new RRC connection.

The channels used to transmit the random access preamble and the data of message 1 could be different.

After receiving the preamble and data from the UE, the gNB will send a random access response to the UE. The random access response may include.

Detected preamble and UE ID: This field is to identify whether the received random access response from gNB is for the UE who sent the same random access preamble and UE ID;
Timing advance if necessary;
RRC reply if there is any RRC message sent in Msg 1 and ACK/NAK for data,
UL grant. The gNB will allocate UL grant for additional data transmission; and
A unique identifier, for example a C-RNTI. This identifier will be used to address the following additional data transmission;

In other words, the random access response message comprises one or more of an indication of an uplink grant, the uplink grant comprising second radio resources which can be used by the communications device for the transmission of the second signal, a unique identifier which is assigned by the infrastructure equipment to identify the communications device for the transmission of the second signal, an RRC response message in response to an RRC message comprised within the first signal, an indication of a random access preamble and/or communications device identifier detected by the infrastructure equipment, an acknowledgement or negative acknowledgement, ACK/NACK, on the basis of whether the first portion of the data was successfully received by the infrastructure equipment, and a timing advance command.

Message 3 may contain additional data to transmit, for example:

An RRC message if necessary following the RRC message sent in message 2; and
User data which can not be fully accommodated in message 1.

In other words, as well as comprising the second portion of the data, the second signal further comprises a second RRC message in response to the RRC response message received from the infrastructure equipment.

In some embodiments of the present technique, the controller is configured in combination with the receiver to receive an ACK/NACK on the basis of whether the second portion of the data was successfully received by the infrastructure equipment.

Figure 8:
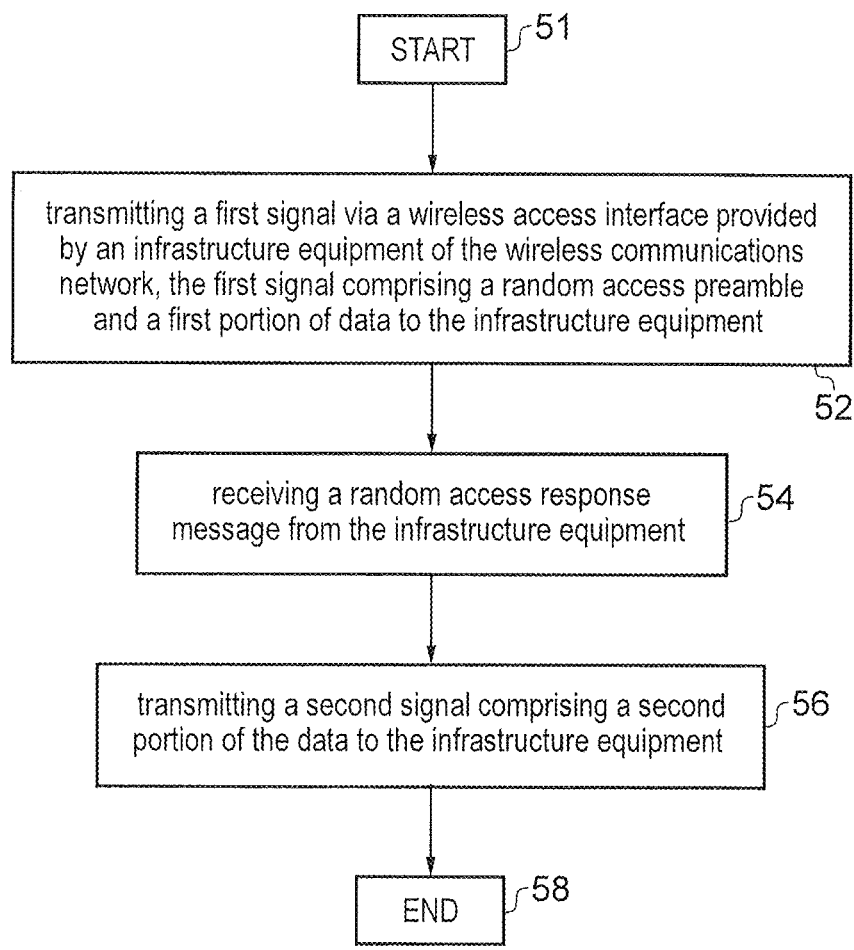
FIG. 8 shows a flow diagram illustrating a process of communications between a communications device and an infrastructure equipment in accordance with embodiments of the present technique.

FIG. 8 shows a flow diagram illustrating a process of communications between a communications device operating in an inactive mode (e.g. RRC_IDLE) and an infrastructure equipment of a wireless communications network in accordance with embodiments of the present technique. The method, which is a method of controlling the communications device, begins in step S1. The method comprises, in step S2, transmitting a first signal via a wireless access interface provided by an infrastructure equipment of the wireless communications network, the first signal comprising a random access preamble and a first portion of data to the infrastructure equipment. The method then comprises in step S4, receiving a random access response message from the infrastructure equipment. In step S6, the process comprises transmitting a second signal comprising a second portion of the data to the infrastructure equipment. The process ends in step S8.

Advantages of embodiments of the present technique include a hybrid, enhanced RACH procedure which can be used in NR wireless communications system which has both the advantage of the reduced delay performance of the presently known two-step RACH procedure, whilst large amounts of data can be accommodated with the data transmission with the RACH.

The following numbered paragraphs provide further example aspects and features of the present technique:

Paragraph 1. A communications device for transmitting data to or receiving data from a wireless communications network, the communications device comprising
transmitter circuitry configured to transmit signals to one or more infrastructure equipment of the wireless communications network via a wireless access interface provided by the one or more infrastructure equipment,
receiver circuitry configured to receive signals from one or more of the infrastructure equipment via the wireless access interface, and
controller circuitry configured to control the transmitter circuitry and the receiver circuitry to transmit or to receive the signals representing data, wherein when the communications device is in an inactive state, the controller circuitry is configured in combination with the receiver circuitry and the transmitter circuitry
to transmit a first signal comprising a random access preamble and a first portion of data to one of the infrastructure equipment,
to receive a random access response message from the infrastructure equipment, and
to transmit a second signal comprising a second portion of the data to the infrastructure equipment.

Paragraph 2. A communications device according to Paragraph 1, wherein the controller circuitry is configured to select the random access preamble from a set of random access preambles which are specifically used to indicate that a signal corresponding to the first signal is being transmitted.

Paragraph 3. A communications device according to Paragraph 1 or Paragraph 2, wherein the controller circuitry is configured in combination with the transmitter circuitry to transmit the first signal using first radio resources indicated by the infrastructure equipment.

Paragraph 4. A communications device according to Paragraph 2, wherein the controller circuitry is configured in combination with the transmitter circuitry to determine first radio resources which should be used to transmit the first signal on the basis of the random access preamble selected from the set of random access preambles, and to transmit the first signal using the determined radio resources.

Paragraph 5. A communications device according to any of Paragraphs 1 to 4, wherein the first signal further comprises one or more of:
- a first portion of user data,
- an identifier of the communications device,
- an indication that the second portion of data is available to be transmitted,
- an indication of the size of the second portion of data, and
- a Radio Resource Control, RRC, message comprising a request to resume an RRC connection or a request to set up a new RRC connection.

Paragraph 6. A communications device according to any of Paragraphs 1 to 5, wherein the random access response message comprises one or more of:
- an indication of an uplink grant, the uplink grant comprising second radio resources which can be used by the communications device for the transmission of the second signal,
- a unique identifier which is assigned by the infrastructure equipment to identify the communications device for the transmission of the second signal,
- an RRC response message in response to an RRC message comprised within the first signal,
- an indication of a random access preamble and/or communications device identifier detected by the infrastructure equipment,
- an acknowledgement or negative acknowledgement, ACK/NACK, on the basis of whether the first portion of the data was successfully received by the infrastructure equipment, and
- a timing advance command.

Paragraph 7. A communications device according to Paragraph 6, wherein the second signal further comprises a second RRC message in response to the RRC response message received from the infrastructure equipment.

Paragraph 8. A communications device according to any of Paragraphs 1 to 7, wherein the controller is configured in combination with the receiver to receive an ACK/NACK on the basis of whether the second portion of the data was successfully received by the infrastructure equipment.

Paragraph 9. A method of operating a communications device in an inactive state for transmitting data to or receiving data from a wireless communications network, the method comprising
- transmitting a first signal via a wireless access interface provided by an infrastructure equipment of the wireless communications network, the first signal comprising a random access preamble and a first portion of data to the infrastructure equipment,
- receiving a random access response message from the infrastructure equipment, and
- transmitting a second signal comprising a second portion of the data to the infrastructure equipment.

Paragraph 10. A method according to Paragraph 9, wherein the first signal further comprises one or more of:
- a first portion of user data,
- an identifier of the communications device,
- an indication that the second portion of data is available to be transmitted,
- an indication of the size of the second portion of data, and
- a Radio Resource Control, RRC, message comprising a request to resume an RRC connection or a request to set up a new RRC connection.

Paragraph 11. A method according to Paragraph 9 or Paragraph 10, wherein the random access response message comprises one or more of:
- an indication of an uplink grant, the uplink grant comprising second radio resources which can be used by the communications device for the transmission of the second signal,
- a unique identifier which is assigned by the infrastructure equipment to identify the communications device for the transmission of the second signal,
- an RRC response message in response to an RRC message comprised within the first signal,
- an indication of a random access preamble and/or communications device identifier detected by the infrastructure equipment,
- an acknowledgement or negative acknowledgement, ACK/NACK, on the basis of whether the first portion of the data was successfully received by the infrastructure equipment, and
- a timing advance command.

Paragraph 12. An infrastructure equipment for transmitting data to or receiving data from a communications device, the infrastructure equipment forming part of a wireless communications network and comprising
- transmitter circuitry configured to transmit signals to the communications device via a wireless access interface provided by the wireless communications network,
- receiver circuitry configured to receive signals from the communications device via the wireless access interface, and
- controller circuitry configured to control the transmitter circuitry and the receiver circuitry to transmit or to receive the signals representing data, wherein when the communications device is in an inactive state, the controller circuitry is configured in combination with the receiver circuitry and the transmitter circuitry
  - to receive a first signal comprising a random access preamble and a first portion of data from the communications device,
  - to transmit a random access response message to the communications device, and
  - to receive a second signal comprising a second portion of the data from the communications device.

Paragraph 13. A method of operating an infrastructure equipment for transmitting data to or receiving data from a communications device in an inactive state, the infrastructure equipment forming part of a wireless communications network, the method comprising
- receiving a first signal via a wireless access interface provided by the wireless communications network, the first signal comprising a random access preamble and a first portion of data from the communications device,
- transmitting a random access response message to the communications device, and
- receiving a second signal comprising a second portion of the data from the communications device.

Paragraph 14. Circuitry for a communications device for transmitting data to or receiving data from a wireless communications network, the communications device comprising
- transmitter circuitry configured to transmit signals to one or more infrastructure equipment of the wireless communications network via a wireless access interface provided by the one or more infrastructure equipment, receiver circuitry configured to receive signals from one or more of the infrastructure equipment via the wireless access interface, and controller circuitry configured to control the transmitter circuitry and the receiver circuitry to transmit or to receive the signals representing data, wherein when the communications device is in an inactive state, the controller circuitry is configured in combination with the receiver circuitry and the transmitter circuitry to transmit a first signal comprising a random access preamble and a first portion of data to one of the infrastructure equipment, to receive a random access response message from the infrastructure equipment, and to transmit a second signal comprising a second portion of the data to the infrastructure equipment.

Paragraph 15. Circuitry for an infrastructure equipment for transmitting data to or receiving data from a communications device, the infrastructure equipment forming part of a wireless communications network and comprising transmitter circuitry configured to transmit signals to the communications device via a wireless access interface provided by the wireless communications network, receiver circuitry configured to receive signals from the communications device via the wireless access interface, and controller circuitry configured to control the transmitter circuitry and the receiver circuitry to transmit or to receive the signals representing data, wherein when the communications device is in an inactive state, the controller circuitry is configured in combination with the receiver circuitry and the transmitter circuitry to receive a first signal comprising a random access preamble and a first portion of data from the communications device, to transmit a random access response message to the communications device, and to receive a second signal comprising a second portion of the data from the communications device.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software miming on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] RP-151621, "New Work Item: NarrowBand IOT NB-IOT," Qualcomm, RAN #69.
[2] RP-160671, "New SID Proposal: Study on New Radio Access Technology," NTT DOCOMO, RAN #71.
[3] LTE for UMTS: OFDMA and SC-FDMA Based Radio Access, Harris Holma and Antti Toskala, Wiley 2009, ISBN 978-0-470-99401-6.
[4] ETSI TS 136 213 V13.0.0 (2016-01)/3GPP TS 36.212 version 13.0.0 Release 13.
[5] R2-168544, "UL data transmission in RRC_INACTIVE," Huawei, HiSilicon, RAN #96.
[6] R2-168713, "Baseline solution for small data transmission in RRC_INACTIVE," Ericsson, Ran #96.

What is claimed is:

1. A method of operating an infrastructure equipment providing a wireless access interface for transmitting data to or receiving data from a communications device in an inactive state, the method comprising:

receiving a first signal via the wireless access interface, the first signal including a random access preamble and a first portion of data from the communications device;

transmitting a random access response message to the communications device; and receiving a second signal comprising a second portion of the data from the communications device; and transmitting, based on whether the infrastructure equipment successfully receives the second portion, an acknowledgement or a negative acknowledgement (ACK/NACK) to the communications device.

2. The method according to claim 1, wherein the first signal further comprises one or more of:

a first portion of user data, an identifier of the communications device, an indication that the second portion of data is available to be transmitted, an indication of the size of the second portion of data, and a Radio Resource Control, RRC, message comprising a request to resume an RRC connection or a request to set up a new RRC connection.

3. The method according to claim 1, wherein the random access response message comprises one or more of:

an indication of an uplink grant, the uplink grant comprising second radio resources which can be used by the communications device for the transmission of the second signal, a unique identifier which is assigned by the infrastructure equipment to identify the communications device for the transmission of the second signal, an RRC response message in response to an RRC message comprised within the first signal, an indication of a random access preamble and/or communications device identifier detected by the infrastructure equipment, a second ACK/NACK based on whether the first portion of the data was successfully received by the infrastructure equipment, and a timing advance command.

4. The method according to claim 3, wherein the second signal further comprises a second RRC message in response to the RRC response message.

5. The method according to claim 1, wherein the communications device selects the random access preamble from a set of random access preambles which are specifically used to indicate that a signal corresponding to the first signal is being transmitted.

6. The method according to claim 5, wherein the communications device determines first radio resources to be used for transmission of the first signal based on the random access preamble selected from the set of random access preambles, and the first signal is transmitted by the communications device using the determined first radio resources.

7. Circuitry for an infrastructure equipment, the circuitry comprising:

transmitter circuitry;

receiver circuitry; and control circuitry configured to control the transmitter circuitry and the receiver circuitry to:

provide a wireless access interface;

operate in an active state by controlling the transmitter circuitry and the receiver circuitry to transmit or receive signals representing data via the wireless access interface; and operate in an inactive state by controlling the transmitter circuitry and the receiver circuitry to, via the wireless access interface:

receive a first signal comprising a random access preamble and a first portion of data from the communications device;

transmit a random access response message to the communications device;

receive a second signal comprising a second portion of the data from the communications device; and transmit, based on whether the infrastructure equipment successfully receives the second portion, an acknowledgement or a negative acknowledgement (ACK/ACK) to the communications device.

8. The circuitry according to claim 7, wherein the first signal further comprises one or more of:

a first portion of user data, an identifier of the communications device, an indication that the second portion of data is available to be transmitted, an indication of the size of the second portion of data, and a Radio Resource Control, RRC, message comprising a request to resume an RRC connection or a request to set up a new RRC connection.

9. The circuitry according to claim 7, wherein the random access response message comprises one or more of:

an indication of an uplink grant, the uplink grant comprising second radio resources which can be used by the communications device for the transmission of the second signal, a unique identifier which is assigned by the infrastructure equipment to identify the communications device for the transmission of the second signal, an RRC response message in response to an RRC message comprised within the first signal, an indication of a random access preamble and/or communications device identifier detected by the infrastructure equipment, a second ACK/NACK based on whether the first portion of the data was successfully received by the infrastructure equipment, and a timing advance command.

10. The circuitry according to claim 9, wherein the second signal further comprises a second RRC message in response to the RRC response.

11. The circuitry according to claim 7, wherein the communications device selects the random access preamble from a set of random access preambles which are specifically used to indicate that a signal corresponding to the first signal is being transmitted.

12. Circuitry for a communications device, the circuitry comprising:

transmitter circuitry;

receiver circuitry; and control circuitry configured to control the transmitter circuitry and the receiver circuitry to:

operate in an active state by controlling the transmitter circuitry and the receiver circuitry to transmit or receive signals representing data via a wireless access interface provided by one or more infrastructure equipment; and operate in an inactive state by controlling the transmitter circuitry and the receiver circuitry to, via the wireless access interface:

transmit a first signal comprising a random access preamble and a first portion of data to an infrastructure equipment of the one or more infrastructure equipment;

receive a random access response message from the infrastructure equipment;

transmit a second signal comprising a second portion of the data to the infrastructure equipment; and receive, based on whether the infrastructure equipment successfully receives the second portion, an acknowledgement or a negative acknowledgement (ACK/NACK) from the infrastructure equipment.

13. The circuitry according to claim 12, wherein the control circuitry is configured in combination with the transmitter circuitry to transmit the first signal using first radio resources indicated by the infrastructure equipment.

14. The circuitry according to claim 12, wherein the first signal further comprises one or more of:

a first portion of user data, an identifier of the communications device, an indication that the second portion of data is available to be transmitted, an indication of the size of the second portion of data, and a Radio Resource Control, RRC, message comprising a request to resume an RRC connection or a request to set up a new RRC connection.

15. The circuitry according to claim 12, wherein the random access response message comprises one or more of an indication of an uplink grant, the uplink grant comprising second radio resources which can be used by the communications device for the transmission of the second signal, a unique identifier which is assigned by the infrastructure equipment to identify the communications device for the transmission of the second signal, an RRC response message in response to an RRC message comprised within the first signal, an indication of a random access preamble and/or communications device identifier detected by the infrastructure equipment, a second ACK/NACK based on whether the first portion of the data was successfully received by the infrastructure equipment, and a timing advance command.

16. The circuitry according to claim 12, wherein the second signal further comprises a second RRC message in response to the RRC response message.

17. The circuitry according to claim 12, wherein the control circuitry is further configured to select the random access preamble from a set of random access preambles which are specifically used to indicate that a signal corresponding to the first signal is being transmitted.

18. The circuitry according to claim 17, wherein the control circuitry is further configured to determine first radio resources which should be used to transmit the first signal on the basis of the random access preamble selected from the set of random access preambles, and control the transmitter circuitry to transmit the first signal using the determined first radio resources.

* * * * *